United States Patent [19]

Fenton et al.

[11] 3,972,989

[45] Aug. 3, 1976

[54] REDUCING THE CONSUMPTION OF ANTHRAQUINONE DISULFONATE IN STRETFORD SOLUTIONS

[75] Inventors: Donald M. Fenton, Anaheim; Raoul P. Vaell, Los Angeles, both of Calif.

[73] Assignee: Union Oil Company of California, Brea, Calif.

[22] Filed: Aug. 14, 1974

[21] Appl. No.: 497,322

[52] U.S. Cl............................. 423/573 G; 423/226; 423/571
[51] Int. Cl.².......................................... C01B 17/04
[58] Field of Search .......... 423/571, 573, 575, 226, 423/574; 55/73

[56] References Cited
UNITED STATES PATENTS

| | | | |
|---|---|---|---|
| 3,627,465 | 12/1971 | Hamblin | 423/571 |
| 3,642,448 | 2/1972 | Beavon | 423/573 |

FOREIGN PATENTS OR APPLICATIONS

| | | | |
|---|---|---|---|
| 707,914 | 5/1941 | Germany | 423/575 |

*Primary Examiner*—G. O. Peters
*Attorney, Agent, or Firm*—Richard C. Hartman; Dean Sandford; John E. Vanderburgh

[57] ABSTRACT

The consumption of anthraquinone disulfonate by oxidation, employed in the Stretford process which treats hydrogen sulfide-containing gases to yield a sulfur-free effluent gas and elemental sulfur, is reduced by the addition of a chemical precursor to the solution which increases the thiosulfate ion concentration of the solution.

10 Claims, 3 Drawing Figures

REDUCING THE CONSUMPTION OF ANTHRAQUINONE DISULFONATE IN STRETFORD SOLUTIONS

BACKGROUND OF THE INVENTION

1. Field of the Invention

This invention relates to the removal of hydrogen sulfide from gases, and more particularly to a process for removing hydrogen sulfide from hydrogenated Claus process tail gas in which the hydrogen sulfide is converted to elemental sulfur.

2. Description of the Prior Art

With the increasing concern over the pollution of the atmosphere, great demands have been made on industry to produce pollution-free products and to do so in a pollution-free manner. One area of particular concern has been the release of sulfur and its compounds into the atmosphere during petroleum refining, natural gas sweetening, ore processing, coke-oven gas production, and the production of other sulfur-containing gases.

One such process for treating hydrogen sulfide-containing gas which has been used in conjunction with the desulfurization of hydrogen sulfide-containing gases, known as the Claus process, is about 90 to 97 percent effective in converting hydrogen sulfide to elemental sulfur. In many instances it is necessary to further treat the Claus process tail gas to make it acceptable for discharging into the atmosphere. One process particularly useful for treating these tail gases is the Beavon sulfur removal process described in U.S. Pat. No. 3,752,877 which involves the hydrogenation of the Claus process tail gas, to convert the various sulfur compounds to hydrogen sulfide, and then employing a process, known as the Stretford process, to remove the remaining hydrogen sulfide. The Stretford process is a well-known process for converting hydrogen sulfide to elemental sulfur and is generally described in U.S. Pats. Nos. 2,997,439, 3,035,889, and 3,097,926.

However, while the Stretford process has been relatively successful, it has been discovered that when used to treat hydrogenated Claus process tail gas, one of the principal constituents of the Stretford solution, an anthraquinone disulfonate, was being chemically consumed; and this consumption necessitated frequent addition of this expensive chemical. It is to the consumption of anthraquinone disulfonate (ADA) and to the improvement of the Stretford process that this invention is directed.

A principal object of this invention is to provide an improvement in the Stretford process for the removal of hydrogen sulfide from gases and its conversion to elemental sulfur.

Another object of this invention is to provide an improvement in the Stretford process when used to treat hydrogenated Claus process tail gas.

Yet another object of this invention is to reduce the excessive amounts of ADA consumed by oxidation in a Stretford unit used to treat hydrogenated Claus process tail gas.

SUMMARY OF THE INVENTION

It has been found that the consumption of ADA by oxidation in a Stretford unit used to treat a hydrogen sulfide-containing gas can be significantly reduced by the addition to the Stretford solution of a chemical precursor which increases the thiosulfate ion concentration of the solution. In particular, the ADA consumption rate can be substantially reduced by increasing the thiosulfate ion concentration a relatively small amount, at a time during the operation of the Stretford unit when the naturally occurring thiosulfate ion concentration is low, for example less than about 5 grams per liter.

BRIEF DESCRIPTION OF THE DRAWINGS

The invention will be more readily understood by reference to the accompanying drawings, in which.

DETAILED DESCRIPTION

The Stretford process treats a hydrogen sulfide-containing feed gas by contacting the feed gas with an alkaline aqueous solution to yield an effluent gas of reduced sulfur content and to yield elemental sulfur; the solution is thereafter regenerated by contact with an oxygen-containing gas; the elemental sulfur is recovered from said solution; and the regenerated solution is recycled to the feed gas-contacting step.

The solution used in this process is an aqueous solution which has been made alkaline to a Ph of above 7, and preferably between about 8.5 and 9.5 by the addition of alkalis such as caustic soda, caustic potash, ammonia; or sodium, potassium, or ammonium carbonates or bicarbonates; or organic bases such as alkanolamines. The preferred alkalis being the sodium carbonates and bicarbonates, with the sodium carbonates being the most preferred. A mixture of sodium carbonate and bicarbonate may also be used, such as a mixture of about 1 to 8 grams per liter sodium carbonate with about 10 to 30 grams per liter of sodium bicarbonate.

The solution also contains an anthraquinone disulfonate (ADA), particularly the disodium salt. All the known isomers of ADA are suitable for use in this process. Also, mixtures of these isomers may be used with advantage, including commercially available mixtures which contain 1,5/1,8 or 2,6/2,7 ADA and possibly small quantities of other isomers. Isomers 2,6 and 2,7 have a higher reactivity with sulfide and are preferred; but since the 2,7 isomer has a superior solubility in water, it is the most preferred material. The concentration of ADA in the solution, calculated as the disodium salt, can be as high as 6 grams per liter, but more preferably ranges from about 0.3 to 3 grams per liter, and most preferably about 2.5 grams per liter. Throughout this application, the concentration of ADA will be given in terms of the disodium salt.

The solution also contains vanadium in a water-soluble form; such as the metal or ammonium vanadates, including sodium metavanadate, sodium orthovanadate, sodium pyrovanadate, sodium ammonium vanadate, or ammonium vanadate, with sodium metavanadate being preferred. The concentration of vanadium, calculated as the metal, in the solution should be no more than about 5 grams per liter, with the preferred range being 0.3–6 grams per liter; the optimum concentration depending on the volumetric flow rate of the gas and of the solution and the hydrogen sulfide concentration of the gas being treated.

Figure 1:
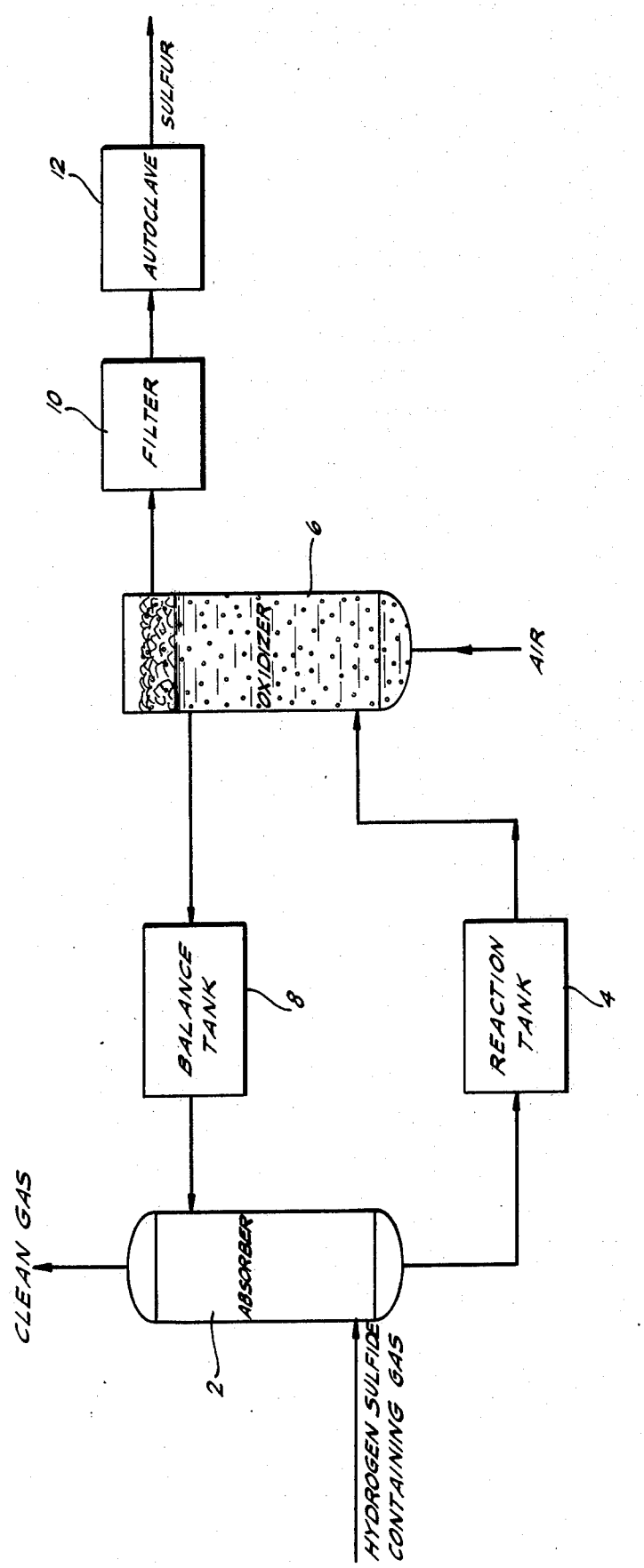
FIG. 1 is a schematic flow diagram of the Stretford process illustrating the manner in which the hydrogen sulfide-containing gas is treated to convert hydrogen sulfide to elemental sulfur; elemental sulfur.

FIG. 1 illustrates the operation of the Stretford process. Hydrogenated Claus process tail gas enters near the bottom of absorber 2. This tail gas typically contains about 1–3 percent hydrogen sulfide; about 2–20 percent carbon dioxide; traces of methane, water, carbonyl sulfide, carbon disulfide, carbon monoxide, methyl mercaptan; and the remainder nitrogen.

The feed gas flows upwardly through absorber 2, countercurrent to, and in intimate contact with the downflowing solution, which enters near the top of absorber 2. In most operations, a sodium carbonate solution is used to react with the hydrogen sulfide to form sodium hydrosulfide:

$$H_2S + Na_2CO_3 \rightarrow NaHS + NaHCO_3 \qquad (1)$$

The hydrosulfide is oxidized to elemental sulfur by the wate-soluble metal vanadate:

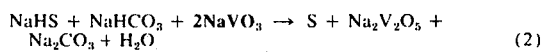

$$NaHS + NaHCO_3 + 2NaVO_3 \rightarrow S + Na_2V_2O_5 + Na_2CO_3 + H_2O \qquad (2)$$

The solution then exits absorber 2 at the bottom thereof and enters reaction tank 4 where further and complete chemical conversion to elemental sulfur takes place. The residence time in reaction tank 4 may typically vary between 10 and 15 minutes.

The sulfur-containing solution then exits reaction tank 4 and enters near the bottom of oxidizer 6. Air is admitted at the bottom of oxidizer 6 and is churned into small bubbles by a submerged rotating stirrer-mixer (not shown) located above the air inlet. The solution, which was chemically reduced in absorber 2 and reaction tank 4, is now regenerated to its initial state. The vanadium, which has been reduced to the quadravalent state, is oxidized by oxygen back to its pentavalent state, using ADA as an oxidation catalyst:

$$Na_2V_2O_5 + \tfrac{1}{2}O_2 \xrightarrow{ADA} 2\,NaVO_3 \qquad (3)$$

The solution then flows to balance tank 8 from where it is ready to be recycled. Elemental sulfur appears as a froth at the top of oxidizer 6, from where it is skimmed off, then filtered by filter 10 and washed by autoclave 12.

It has been found that the Stretford process, when treating hydrogenated Claus process tail gas, loses ADA. ADA was being consumed at rates approaching 6 percent or more of the ADA inventory per day, particularly just after a fresh solution was put on-stream. The magnitude of the problem can be more fully appreciated when it is realized that a Stretford unit, employing 100,000 gallons of Stretford solution, at an ADA level of 2.5 grams per liter, will contain about 2000 pounds of ADA. This means that at a loss rate of 6 percent per day, 120 pounds of ADA are being consumed.

It is known that during the operation of a Stretford unit, sodium thiosulfate is naturally produced in the Stretford solution as a by-product. For a Stretford unit treating hydrogenated Claus process tail gas, the sodium thiosulfate build-up appears to be linear with time and at an approximate rate of 2–7 grams per liter per week, calculated as the pentahydrate.

In the past, the sodium thiosulfate had been considered a deleterious by-product, because it necessitated continuous or periodic bleeding of the Stretford solution as the sodium thiosulfate neared its saturation concentration, in order to avoid the precipitation of salts. The saturation concentration of sodium thiosulfate pentahydrate being above 300 grams per liter, many months of operation are required before the sodium thiosulfate reaches its saturation concentration, at which time the Stretford solution is bled-off and replaced by fresh solution, with a resultant loss of chemicals. Therefore, in order to avoid having to bleed solution and thereby lose chemicals, it has been a goal and desire to maintain the sodium thiosulfate concentration as low as possible.

However, it has now been discovered that as the concentration of sodium thiosulfate increases the ADA consumption rate decreases. It is believed that the mechanism involved is that ADA is being oxidized by hydrogen peroxide which may be produced in the solution during the oxidation step of the process. This oxidation of ADA by hydrogen peroxide may also be catalyzed by any soluble iron present in the solution, which may be the result of metal corrosion in the Stretford unit. It is thought that the thiosulfate ions are being preferentially oxidized by the hydrogen peroxide, and thereby serve as a sacrificial agent in protecting the ADA. While the exact mechanism involved in the actual consumption of the ADA is not known, the relationship between the consumption of ADA by oxidation and the presence of thiosulfate ion has been established.

Figure 2:
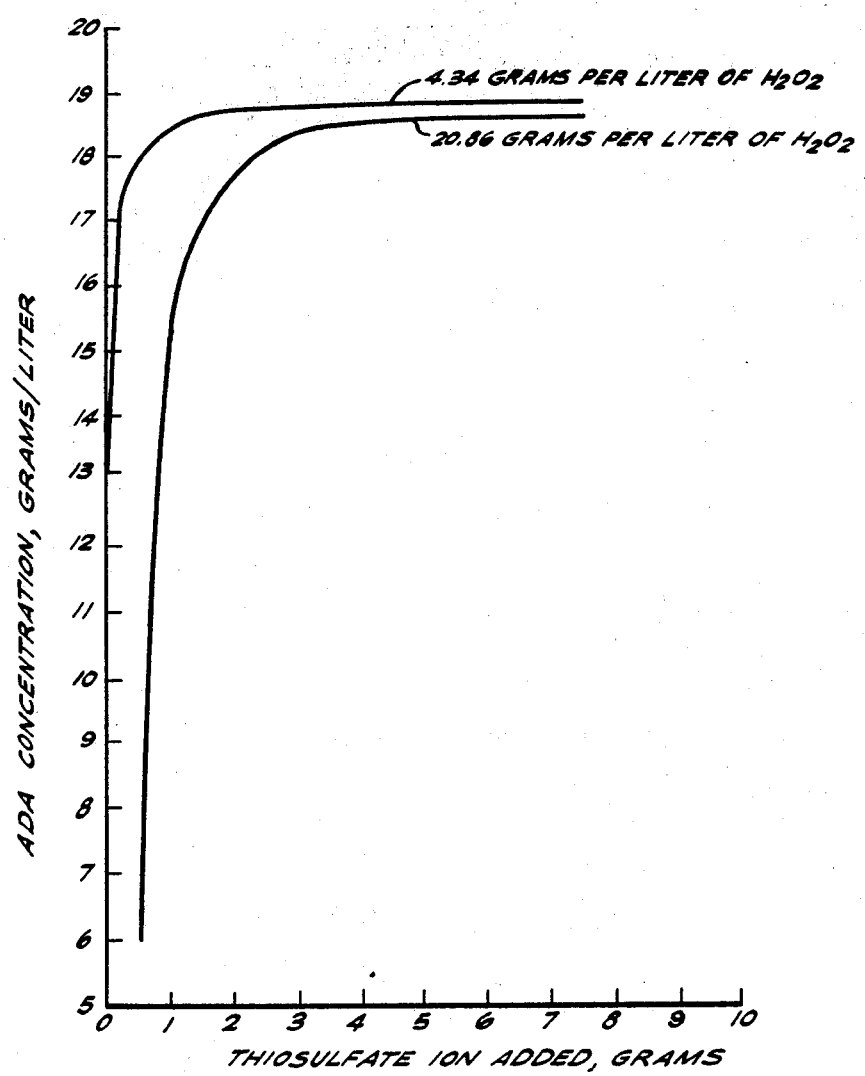
FIG. 2 is a graph showing the ADA concentration in a solution containing ADA, hydrogen peroxide and ferrous chloride as a function of the amount of thiosulfate ion added.

This relationship was demonstrated by two series of laboratory tests, whose results have been plotted in FIG. 2. The tests were designed to show the reduction of ADA consumption with increased amounts of thiosulfate ions in aqueous solutions containing ADA, ferrous chloride and two different concentrations of hydrogen peroxide.

The base solutions used had an ADA concentration of 19.0 grams per liter and contained 0.01 weight percent ferrous chloride. Then hydrogen peroxide was added to the solutions so as to produce one solution having a hydrogen peroxide concentation of 4.34 grams per liter and one having a hydrogen peroxide concentration of 20.86 grams per liter. Various amounts of a thiosulfate ion precursor were added to several samples of these two solutions and the resulting ADA concentrations were determined. FIG. 2 plots the two curves that represent the data obtained.

FIG. 2 shows that for equal additions of thiosulfate ion, the solution containing the higher hydrogen peroxide concentration experienced the greater consumption of ADA, thus tending to show that it is the presence of hydrogen peroxide that is effecting the consumption of ADA in Stretford solutions. FIG. 2 also teaches that for both hydrogen perioxide concentrations the addition of thiosulfate ion decreased the consumption of ADA. However, it is important to note that the decrease of ADA consumption provided by the addition of the thiosulfate ion was not linear and that instead, the marginal decrease of ADA consumption decreased with additional thiosulfate ion. In other words, the most benefit was provided by the addition of the first few grams and that additional thiosulfate ion provided an ever lessening decrease in ADA consumption; in fact, the addition of more than 4 grams of thiosulfate ion provided no additional decrease of ADA consumption for both hydrogen peroxide concentrations.

Further study of FIG. 2 shows that while the ADA consumption in the solution containing the lower hydrogen peroxide concentration was reduced to the lowest amount by the addition of thiosulfate ion, the solution containing the greater hydrogen peroxide concentration experienced the greatest decrease of ADA consumption upon the addition of thiosulfate ion. Also, the addition of more than 4 grams of thiosulfate ion to the solution containing the greater hydrogen peroxide concentration reduced the ADA consumption to almost equal to that of the solution containing the lower hydrogen peroxide concentration.

Figure 3:
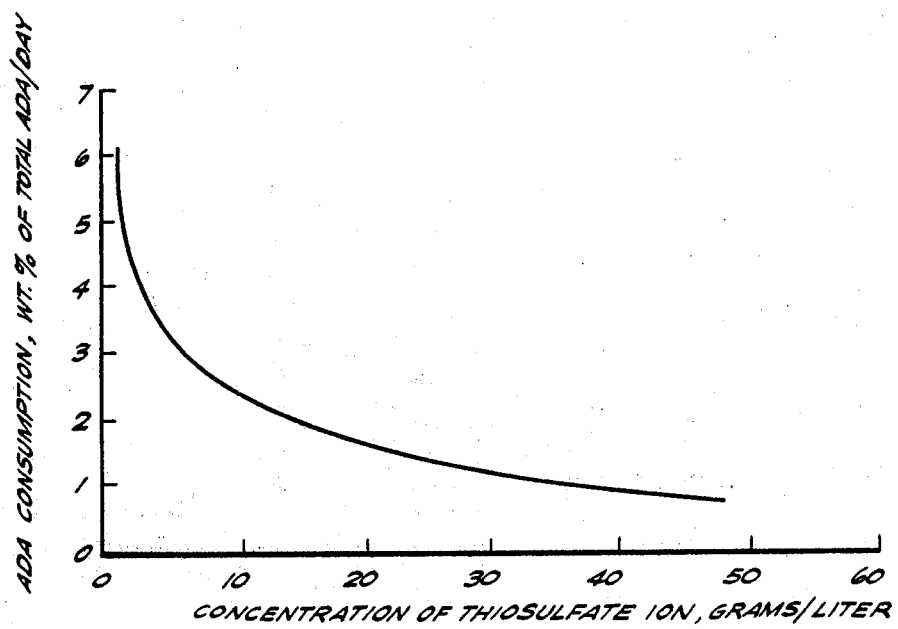
FIG. 3 is a graph illustrating the relationship between the ADA consumption rate and the thiosulfate ion concentration in commercial Stretford units.

FIG. 3 is a graph illustrating the relationship found to exist in commercial Stretford units between the ADA consumption rate as a weight percent of the total amount of ADA in the solution consumed per day versus the thiosulfate ion concentration in grams per liter. As shown by FIG. 3, the consumption rate of ADA decreases with increasing thiosulfate ion concentration. However, the reduction of the ADA consumption rate is not linear with the thiosulfate ion concentration, but it has been found instead that the greatest reduction in the ADA consumption rate occurs at lower thiosulfate ion concentrations.

The improvement of the Stretford process proposed herein is to artificially increase the thiosulfate ion concentration in the Stretford solution by the addition of a thiosulfate ion precursor to the solution. This precursor can itself provide the thiosulfate ion or it can react with the various chemicals present in the commercial Stretford solution, such as the elemental sulfur, and thereby produce the thiosulfate ions.

The thiosulfate ion precursors contemplated by this invention include the ammonium, alkali metal, and alkaline earth metal salts of thiosulfate, sulfite, bisulfite, pyrosulfite, and hydrosulfite, and other sulfur-containing compounds that would produce thiosulfate ions upon their addition to a commercially operating Stretford plant; with the alkali metals being preferred, and the sodium compounds being particularly preferred. It is intended that the naming of all particular chemicals and family of chemicals include the anhydrous and hydrated forms.

Exemplary of the preferred thiosulfate ion precursors that would produce by themselves thiosulfate ions upon their addition to a commercial Stretford solution include ammonium thiosulfate, lithium thiosulfate, potassium thiosulfate, and sodium thiosulfate, with sodium thiosulfate and its hydrate form sodium thiosulfate pentahydrate being particularly preferred.

Exemplary of the preferred chemicals of this invention which would react in a commercial Stretford plant, and particularly with the elemental sulfur in a commercial Stretford solution, to produce thiosulfate ions include ammonium sulfite, ammonium bisulfite, lithium sulfite, potassium pyrosulfite, potassium bisulfite, potassium sulfite, sodium sulfite, sodium hydrosulfite, and sodium bisulfite, with the sodium compounds being particularly preferred.

As illustrated by FIG. 3 any increase in the concentration of thiosulfate will decrease the rate at which the ADA is being consumed; therefore, the thiosulfate ion producing chemical could be added to any initial concentration and in any amount, avoiding saturation conditions, during the operation of the Stretford unit.

However, while this invention is broad to the increasing of the thiosulfate ion concentration from any initial concentration to any greater concentration, less than the saturation concentration, it is preferred to increase the thiosulfate ion concentration at a time when the Stretford solution has a relatively low thiosulfate ion concentration, and particularly to a fresh Stretford solution. It is under this condition that the greatest reduction in the ADA consumption rate is achieved.

It must be remembered that the presence of thiosulfate ion is still undesirable and that when the thiosulfate ion concentration is increased, bleeding of the solution must be started earlier, with a resulting loss of chemicals, including vanadium and carbonate, as well as ADA. For this reason, the increasing of the thiosulfate ion concentration should be conducted in such a manner so as to substantially decrase the ADA consumption rate with a relatively small increase in thiosulfate ion concentration.

This invention is illustrated by the following example which is illustrative of a specific mode of practicing the invention and is not intended as limiting the scope of the invention as defined by the appended claims.

The Stretford process unit selected for testing is producing about 2 long tons of sulfur per day and contains about 100,000 gallons of Stretford solution. The Stretford unit is being fed hydrogenated tail gas from a Claus process unit, which is treating a hydrogen sulfide-containing gas. The approximate composition of the solution is 2.5 grams per liter of ADA, 2.3 grams per liter of vanadium, 12.5 grams per liter of sodium bicarbonte and 7.5 grams per liter of sodium carbonate. The pH of the solution is about 8.7.

The average concentration of thiosulfate ion is estimated to be about 1.6 grams per liter and at this concentration the ADA consumption rate is estimated to be about 5.6 percent of the total amount of the ADA in the solution per day. Sufficient sodium thiosulfate pentahydrate is added to the solution to bring the thiosulfate ion concentration up to about 20 grams per liter. The ADA consumption rate is again determined and found to have dropped to about 1.7 percent.

It is within the scope of this invention to add a thiosulfate ion precursor to the Stretford unit at any time during its operation to increase the thiosulfate ion concentration in the Stretford solution, and particularly at the start-up of the unit with a fresh solution. By adding the thiosulfate ion precursor to a fresh Stretford solution, the operation of the unit during the period of normally low thiosulfate ion concentration is avoided with the high consumption of ADA.

It is desired to add a sufficient amount of a thiosulfate ion precursor so as to reduce the consumption of the ADA by oxidation to less than about 4 weight percent of the total amount of ADA in the solution per day, preferably less than about 3 weight percent, and more preferably less than about 2 weight percent.

In order to achieve the above described reductions it may be necessary to add a sufficient amount of a thiosulfate ion precursor to provide a thiosulfate ion concentration in the Stretford solution of above about 5 grams per liter, and in some cases of above about 15 grams per liter.

When a thiosulfate ion precursor is added to the Stretford solution, it is prefered that the thiosulfate ion concentration be increased to not more than about 50 grams per liter, and particularly to not more than about 25 grams per liter.

In particular it is preferred to add a sufficient amount of a thiosulfate ion precursor so as to increase the thiosulfate ion concentration from less than about 5 grams per liter to between about 5 and 50 grams per liter, and preferably between about 5 and 25 grams per liter so as to reduce the ADA consumption rate by oxidation to less than about 2 weight percent of the total amount of ADA in the Stretford solution per day.

Various embodiments and modifications of this invention have been described in the foregoing description, and further modifications will be apparent to those skilled in the art. Such modifications are included within the scope of this invention as defined by the following claims.

Having now described the invention,

We claim:

1. In a process for treating a hydrogen sulfide-containing feed gas to convert the hydrogen sulfide to elemental sulfur in which said feed gas is contacted with an alkaline aqueous solution containing a water-soluble metal vanadate and a water-soluble anthraquinone disulfonate to yield an effluent gas of reduced sulfur content, the solution is thereafter regenerated by contact with an oxygen-containing gas, elemental sulfur is recovered from said solution, and said regenerated solution is recycled to said feed gas contacting step, and wherein said anthraquinone disulfonate is being consumed by oxidation, the improvement which comprises the additional step of adding a thiosulfate ion precursor to said solution to increase the concentration of thiosulfate ion in said solution, said thiosulfate ion precursor being selected from the group consisting of the ammonium, alkali metal, and alkaline earth metal salts of thiosulfate, sulfite, bisulfite, pyrosulfite and hydrosulfite.

2. The process defined in claim 1 wherein the anthraquinone disulfonate is being consumed at a rate exceeding about 4 weight percent of the anthraquinone disulfonate in said solution per day and said thiosulfate ion precursor is added to said solution in an amount sufficient to reduce the consumption of said anthraquinone disulfonate by oxidation to less than about 4 weight percent per day.

3. The process defined in claim 1 wherein the thiosulfate ion concentration in said solution is below about 5 grams per liter and said thiosulfate ion precursor is added to said solution in an amount sufficient to provide a thiosulfate ion concentration of above about 5 grams per liter.

4. The process defined in claim 1 wherein said thiosulfate ion precursor is sodium thiosulfate.

5. The process defined in claim 1 wherein the thiosulfate ion concentration in said solution is increased from less than about 5 grams per liter to between about 5 and 50 grams per liter.

6. In a process for treating hydrogenated Claus process tail gas to convert the contained hydrogen sulfide to elemental sulfur in which said tail gas is contacted with an alkaline aqueous solution containing a water-soluble metal vanadate and a water-soluble anthraquinone disulfonate to yield an effluent gas of reduced sulfur content, the solution is thereafter regenerated by contact with an oxygen-containing gas and elemental sulfur is recovered from the solution, and said regenerated solution is recycled to said tail gas contacting step, and wherein said anthraquinone disulfonate is being consumed by oxidation at a rate exceeding about 3 weight percent of the anthraquinone disulfonate in said solution per day, the improvement which comprises the additional of adding a sufficient amount of a thiosulfate ion precursor to said solution to reduce the consumption of anthraquinone disulfonate by oxidation to less than about 3 weight percent per day, said thiosulfate ion precursor being selected from the group consisting of the ammonium, alkali metal and alkaline earth metal salts of thiosulfate, sulfite, bisulfite, pyrosulfite and hydrosulfite.

7. The process defined in claim 6 wherein said thiosulfate ion precursor is added to said solution in an amount sufficient to increase the thiosulfate ion concentration in said solution from below about 15 grams per liter to a concentration above about 15 grams per liter sufficient to reduce the consumption of said anthraquinone disulfonate by oxidation from above about 2 weight percent of the anthraquinone disulfonate in said solution per day to less than about 2 weight percent per day.

8. The process defined in claim 6 wherein said thiosulfate ion precursor is sodium thiosulfate.

9. In a process for treating hydrogenated Claus process tail gas to convert the contained hydrogen sulfide to elemental sulfur in which said tail gas is contacted with an alkaline aqueous solution containing sodium vanadate and disodium anthraquinone disulfonate to shield an effluent gas of reduced sulfur content, the solution is thereafter regenerated by contact with an oxygen-containing gas and elemental sulfur is recovered from said solution, and said regenerated solution is recycled to said tail gas contacting step, and wherein said disodium anthraquinone disulfonate is being consumed by oxidation at a rate exceeding about 2 weight percent of the disodium anthraquinone disulfonate in said solution per day, the improvement which comprises the additional step of adding a sufficient amount of sodium thiosulfate to said solution to increase the thiosulfate ion concentration in said solution from less than about 5 grams per liter to between about 5 and 50 grams per liter and in an amount sufficient to reduce the consumption of said disodium anthraquinone disulfonate by oxidation to less than about 2 weight percent per day.

10. The process defined in claim 9 wherein the thiosulfate ion concentration is increased to between about 5 and 25 grams per liter.

* * * * *

UNITED STATES PATENT AND TRADEMARK OFFICE
CERTIFICATE OF CORRECTION

PATENT NO. : 3,972,989

DATED : August 3, 1976

INVENTOR(S) : DONALD M. FENTON and RAOUL P. VAELL

It is certified that error appears in the above—identified patent and that said Letters Patent are hereby corrected as shown below:

In the Column 8, line number 37, in Claim 9,

"shield" should be corrected to read --yield--.

Signed and Sealed this

Nineteenth Day of October 1976

[SEAL]

Attest:

RUTH C. MASON
*Attesting Officer*

C. MARSHALL DANN
*Commissioner of Patents and Trademarks*